US007688956B2

(12) United States Patent
Norris et al.

(10) Patent No.: US 7,688,956 B2
(45) Date of Patent: Mar. 30, 2010

(54) METHOD AND APPARATUS FOR VALIDATION OF FACSIMILE COMMUNICATION

(75) Inventors: Duane E. Norris, Richmond, KY (US); Steven A. Rice, Shelbyville, KY (US); Douglas L. Robertson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1581 days.

(21) Appl. No.: 10/878,852

(22) Filed: Jun. 28, 2004

(65) Prior Publication Data

US 2005/0286072 A1 Dec. 29, 2005

(51) Int. Cl.
*H04M 11/00* (2006.01)

(52) U.S. Cl. ............................ 379/100.16; 379/100.05

(58) Field of Classification Search ............ 379/100.16, 379/100.15, 100.05, 93.09
See application file for complete search history.

(56) References Cited

U.S. PATENT DOCUMENTS 5,287,402 A 2/1994 Nakajima
5,349,634 A 9/1994 Shimomura
5,444,771 A * 8/1995 Ohnishi ................ 379/100.16
5,519,768 A 5/1996 Moquin et al.
5,892,816 A 4/1999 Sih et al.
5,974,123 A * 10/1999 Nakayama et al. ..... 379/100.16
6,075,847 A 6/2000 Leung
6,415,024 B1 7/2002 Dunn et al.

* cited by examiner

*Primary Examiner*—Stella L Woo

(57) ABSTRACT

Methods and system for validating facsimile communications by ensuring that each detected facsimile calling tone is actually a facsimile calling tone that was generated by a sending facsimile device. The method can include establishing a connection between a sending facsimile device and a receiving facsimile device, which was initiated by either the sending facsimile device or the receiving facsimile device. The connection can be utilized for at least one of facsimile communication, voice communication, and a combination of facsimile communication and voice communication. The method can also comprise switching the receiving facsimile machine from a voice-capable mode to a facsimile mode once at least one facsimile calling tone is detected after a first facsimile calling tone is detected while the receiving facsimile device in the line monitoring mode.

25 Claims, 2 Drawing Sheets

METHOD AND APPARATUS FOR VALIDATION OF FACSIMILE COMMUNICATION

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The invention relates generally to facsimile communication, and more specifically to validation of facsimile communication.

2. Description of the Related Art

Facsimile communication can occur between a number of different types of facsimile devices. Facsimile devices are generally configured for at least one of facsimile communication, voice communication, and a combination of facsimile communication and voice communication. Facsimile devices may also be configured for other types of communication (e.g., data communication).

Facsimile communication is often initiated when a receiving facsimile device detects a single facsimile calling tone (e.g., a CNG tone or calling tone as defined by the Group 3 facsimile protocol). In some cases, a receiving facsimile device may improperly detect a sound other than a facsimile tone (e.g., a human voice) as the facsimile calling tone. This can occur if the frequency and duration of the other sound are similar to the frequency and duration of the facsimile tone. Improper detection of a facsimile tone can lead to disruption of the intended communication (e.g., a voice communication).

SUMMARY OF THE INVENTION

The invention provides methods of and systems for validating facsimile communications by ensuring that each detected facsimile calling tone is actually a facsimile calling tone that was generated by a sending facsimile device.

In one construction, the invention provides a method of validating a facsimile communication between a sending facsimile device and a receiving facsimile device. The method can comprise the receiving facsimile device executing a line monitoring mode after a connection is established between the sending facsimile device and the receiving facsimile device. Either one of the sending facsimile device and the receiving facsimile device can initiate the connection. The connection can be utilized for at least one of facsimile communication, voice communication, and a combination of facsimile communication and voice communication. The method can also comprise switching the receiving facsimile machine from a voice-capable mode to a facsimile mode once at least one facsimile calling tone is detected after a first facsimile calling tone is detected while the receiving facsimile device in the line monitoring mode.

In another construction, the invention provides a communication device operable for at least one of facsimile communication, voice communication, and a combination of facsimile communication and voice communication. The communication device can comprise a facsimile calling tone detection module and a communication mode selector. The facsimile calling tone detection module can be operable to detect a plurality of signals after a connection is established between the communication device and a second communication device, where each of the plurality of signals has a frequency in a frequency band corresponding to a facsimile calling tone. The connection can be used for at least one of facsimile communication, voice communication, and a combination of facsimile communication and voice communication. The communication mode selector can be operable to switch the communication device from a voice-capable mode to a facsimile mode once the facsimile calling tone detection module detects at least two facsimile calling tones after the connection is established.

In yet another construction, the invention provides a method of validating a facsimile communication. The method can comprise a first communication device detecting at least two facsimile calling tones after a connection is established between the first communication device and a second communication device. The connection can be utilized for at least one of facsimile communication, voice communication, and a combination of facsimile communication and voice communication. The method can also comprise switching the first communication device from a first communication mode to a second communication mode once the at least two facsimile calling tones are detected by the first communication device. The first communication mode can comprise a voice-capable communication mode. The second communication mode can comprise a facsimile communication mode.

Aspects of the invention, together with the organization and operation thereof, will become apparent to those skilled in the art from the following detailed description when taken in conjunction with the accompanying drawings.

BRIEF DESCRIPTION OF THE DRAWINGS

FIG. 1 is a schematic diagram illustrating a communication system including communication devices operable for facsimile communication there between.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of “including,” “comprising” or “having” and variations thereof herein is meant to encompass the items listed thereafter and equivalents thereof as well as additional items. The terms “mounted,” “connected,” “coupled,” and “supported” are used broadly and encompass both direct and indirect mountings, connections, couplings, and supports. Further, “connected” and “coupled” are not restricted to physical or mechanical connections or couplings, and can include, for example, electrical connections or couplings, whether direct or indirect. The order of limitations specified in any method claims does not imply that the steps or acts set forth therein must be performed in that order, unless an order is explicitly set forth in the specification.

In addition, it should be understood that constructions of the invention can include hardware and/or software components or modules that, for purposes of discussion, may be illustrated and described as if the majority of the components are implemented using firmware. However, one of ordinary skill in the art, and based on a reading of this detailed description, would recognize that, in at least one construction, the firmware based aspects of the invention may be implemented solely in hardware, software, or alternative combinations thereof. As such, it should be noted that a plurality of hardware and software based devices, as well as a plurality of different structural components may be utilized to implement the invention.

Figure 1:
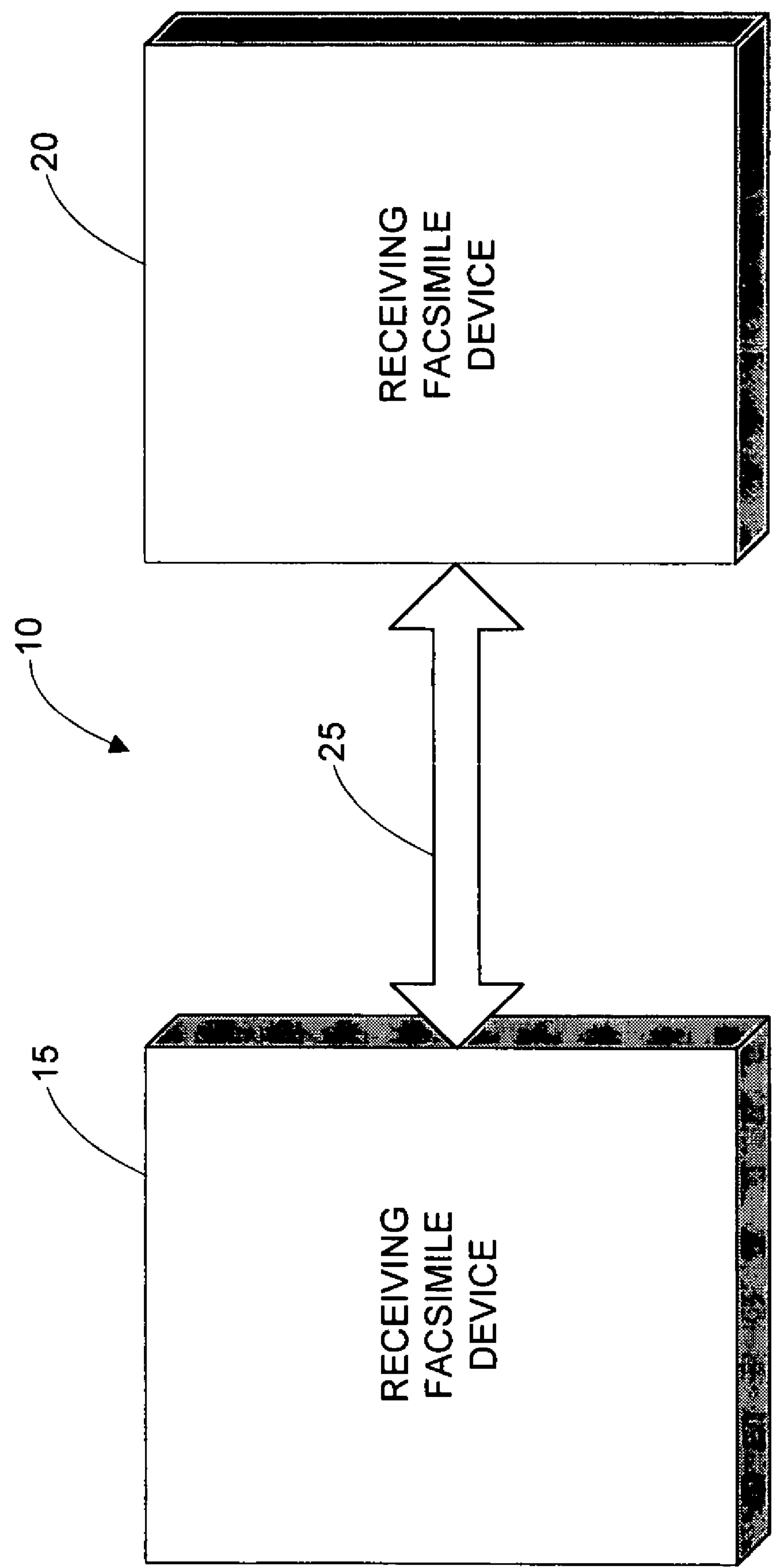

FIG. 1 illustrates a communication system 10 for communication between a receiving facsimile device 15 and a sending facsimile device 20. The facsimile devices 15 and 20 can include any device configured to conduct facsimile communication (e.g., the sending and/or receiving of images and written material over a communication channel 25 such as a telephone line, a network, a wireless link, and the like). Examples of facsimile devices include facsimile machines, multi-functional machines, computers, and the like. The facsimile devices 15 and 20 can also be configured for other types of communication (e.g., voice communication, data communication, and the like). Although the invention is described with respect to the receiving facsimile device 15 and the sending facsimile device 20, aspects of the invention are applicable to communication between a facsimile device and other types of communication devices that are not configured for facsimile communication (e.g., telephones). For example, the invention can be utilized to prevent a facsimile device from improperly recognizing other sounds as facsimile calling tones. Such recognition can significantly reduce interruption of non-facsimile communications caused by facsimile protocols.

Figure 2:
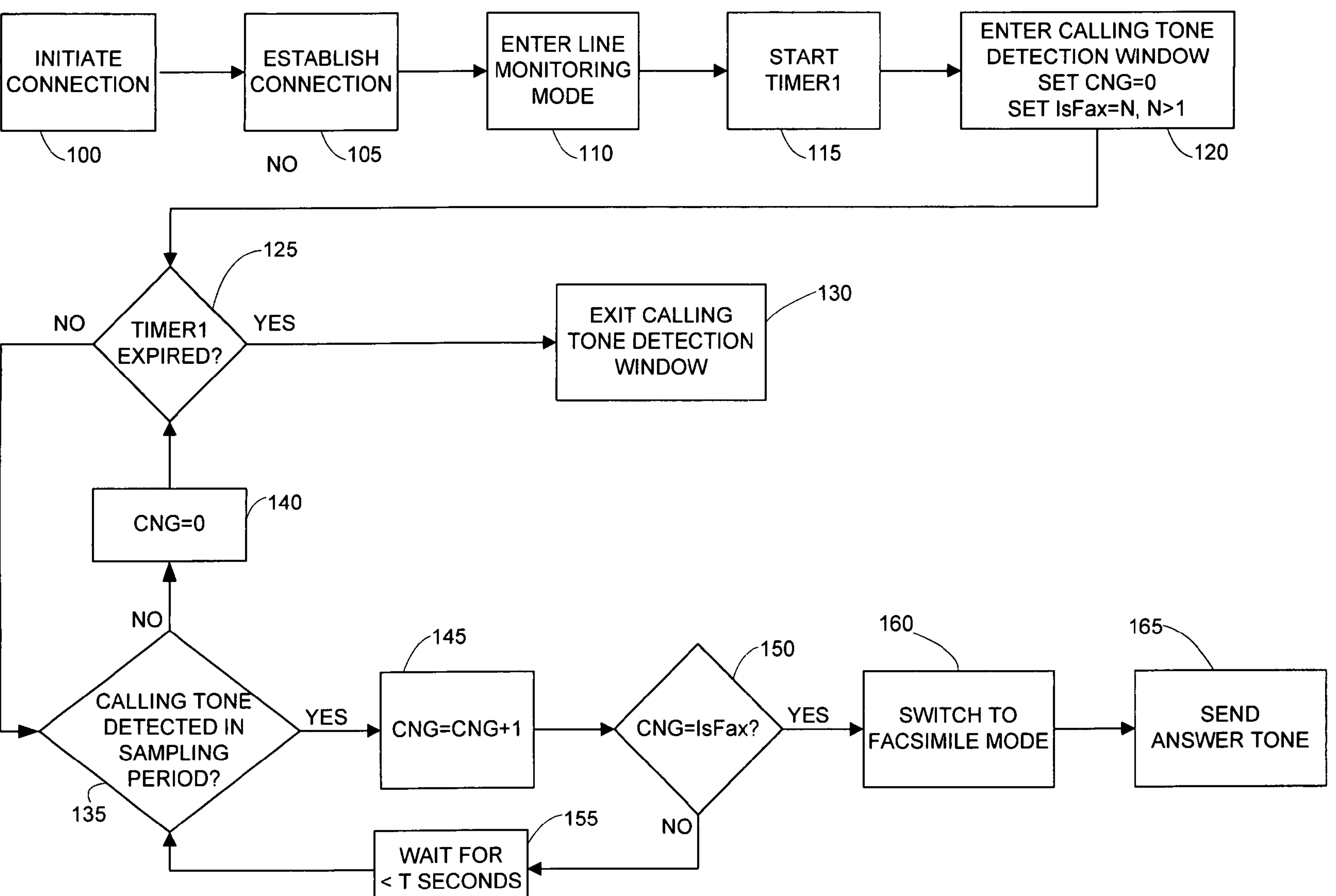
FIG. 2 is a flow chart illustrating one embodiment of a method of the invention.

The receiving facsimile device 15 can include a processor and a memory associated with the processor. The processor can execute a software program stored in the memory to perform a method of the invention. In some embodiments, a method of the invention can be executed using firmware. FIG. 2 is a flow chart of a method of the invention used to validate facsimile communication. Although the receiving facsimile device 15 is described herein as including a single processor that executes a single software program, it should be understood that the system can include multiple processors, memories, and/or software programs. Further, the method of the invention illustrated in FIG. 2 can be performed using other systems.

With reference to FIG. 2, a connection is initiated (at 100) by a calling party. Either the receiving facsimile device 15 or the sending facsimile device 20 can act as the calling party. The connection can be initiated manually and/or automatically.

The connection is established (at 105) when an answering party (e.g., the receiving facsimile device 15) responds to the initiation request. Similar to the initiation process, the establishment process can be accomplished manually (e.g., a user answers the line) or automatically (e.g., auto-answer is enabled to answer the line after a predetermined number of rings). Once established, the connection can be utilized for any type of communication including facsimile communication, voice communication, data communication, and combinations thereof. Generally, once the connection is established, the receiving facsimile device 15 enters a communication mode that allows for any number of the different types of communication to proceed (e.g., an everything mode that allows for each type of communication to proceed, a voice-capable mode that allows for at least voice communication to proceed, and the like). In some embodiments, the communication mode can depend on the capabilities of the facsimile device.

After the connection is established between the receiving facsimile device 15 and the sending facsimile device 20, the receiving facsimile device 15 enters (at 110) a line monitoring mode where the receiving facsimile device 15 monitors activity of the connection. The line monitoring mode can include an off-hook line monitoring mode (i.e., monitoring of the connection activity after picking-up the line) and/or an on-hook line monitoring mode (i.e., monitoring of the connection activity prior to picking-up the line).

A first timer, TIMER1, with a predetermined duration can be started (at 115). The first timer can include any time duration. For example, in some embodiments, the first timer has an infinite time duration. In other embodiments, the duration can be shorter.

The receiving facsimile device 15 can enter (at 120) a facsimile calling tone detection window. In some embodiments, a facsimile calling tone counter, CNG, is initialized with a value of zero when the facsimile calling tone detection window is entered (see at 120). Also (at 120) a threshold value, IsFax, for determining switching to a facsimile mode is initialized to a nonzero value, N, that is greater than 1.

During this detection window, a facsimile calling tone detection module of the receiving facsimile device 15 can listen for sounds having a frequency and duration similar to a facsimile calling tone. A facsimile calling tone (e.g., a CNG tone) is the distinctive tone generated by a sending facsimile device to enable facsimile communication with a receiving facsimile device. A facsimile calling tone can have frequencies of 1100±38 Hz. The facsimile calling tone can include a train of on and off pulses with each pulse having an on-state of approximately 425-575 milliseconds and an off-state of approximately 2550-3450 milliseconds. In other embodiments, the facsimile calling tone can include other frequencies and/or duration. The period of the facsimile calling tone is used as the basis for the sampling period. The period of the facsimile calling tone varies between about 3 seconds to about 4.025 seconds. Generally, the sampling window is set to avoid detection of randomly spaced sounds having a frequency similar to a facsimile calling tone. Preferably the sampling period should be at least about 3 seconds in length to about 4 seconds in length.

In some embodiments, the duration of the first timer can establish the length of the facsimile calling tone detection window. Accordingly, a determination (at 125) of whether the duration of the first timer TIMER1 has expired is made. If the first timer has expired, the facsimile calling tone detection window is exited (at 130). Generally, when the facsimile calling tone window is exited, it is assumed the calling party established the connection for non-facsimile communication. If the first timer, TIMER1, has not expired, a determination (at 135) can be made of whether a facsimile calling tone has been detected during the predefined sampling period. Preferably, a facsimile calling tone has been determined to have occurred if the process recognizes an 1100+/−38 Hz signal having an ON duration from approximately about 425 msec to about 575 msec, followed by an OFF duration from approximately about 2550 msec to about 3450 msec. This is then followed by another 1100+/−38 Hz signal in the ON state for a sufficient duration.

If a facsimile calling tone has not been detected during this sampling period (e.g., an on-state of a facsimile calling tone pulse has not been detected), a facsimile calling tone counter is set (at 140) to zero (CNG=0) and the status of TIMER1 is determined once again. In some embodiments, the facsimile calling tone counter is initialized with a value of zero when the facsimile calling tone detection window is entered (see at 120) in which case performance of setting the calling tone counter at 140 would not be needed and the system would directly return to determining the status of TIMER1.If a facsimile calling tone has been detected (at 135) during a predefined sampling period, than the process proceeds to 145. If the facsimile calling tone is the first facsimile calling tone detected, the facsimile calling tone counter is equal to zero and this counter can then be incremented, i.e., CNG=CNG+1, (at 145).

A determination (at 150) of whether the facsimile calling tone counter is equal to a threshold value, IsFax can then be made (CNG=IsFax?). In some embodiments, the threshold value IsFax is set at a level (e.g., a threshold level of four) to ensure that the receiving facsimile device 15 is not actually detecting other sounds, which are mimicking facsimile calling tones. In other embodiments, the threshold level could be higher or lower. However, a threshold level of at least two is required, and the threshold level generally should not be so high that it significantly delays the facsimile communication.

If the threshold value, IsFax, has not been reached, a delay T is provided (at 155) before returning (at 135) to make a redetermination if a calling tone is detected during the sampling period. The delay T is preferably less than three seconds although shorter or longer time periods could be used. For example, in some embodiments, the delay T could have a duration approximately equal to the duration of one period of the facsimile calling tone.

Once the threshold, IsFax, is reached, the communication mode is switched (at 160) to a facsimile mode by a communication mode selector of the receiving facsimile device 15. In some embodiments, existing communication (e.g., voice communication, data communication) is terminated when the receiving facsimile device 15 is switched to a facsimile mode. For example, detection of a facsimile calling tone can occur during, after, and/or a combination of during and after the voice communication. Accordingly, the voice communication can be terminated to avoid interference with the facsimile communication.

After switching to the facsimile mode, the receiving facsimile device 15 can (at 165) send a facsimile answer tone (e.g., a CED tone) to the sending facsimile device 20 to initiate facsimile communication once the receiving facsimile device 15 is in the facsimile mode. In some embodiments, the facsimile answer tone includes a three second duration and a frequency of approximately 2100 Hz. In other embodiments, the facsimile answer tone can include other frequencies and/or duration. Once the sending facsimile device 20 recognizes the facsimile answer tone, facsimile communication can proceed.

Various aspects of the invention are set forth in the following claims. What is claimed is:

What is claimed is:

1. A method of validating a facsimile communication between a sending facsimile device and a receiving facsimile device having at least a voice-capable mode and a facsimile capable mode, the method comprising:

initiating a connection between the sending facsimile device and the receiving facsimile device using one of the sending facsimile device and the receiving facsimile device;

establishing the connection between the sending facsimile device and the receiving facsimile device, the connection being utilized for at least one of facsimile communication, voice communication, and a combination of facsimile communication and voice communication;

executing a line monitoring mode using the receiving facsimile device after the connection is established;

detecting at the receiving facsimile device at least one facsimile calling tone after a first facsimile calling tone is detected while in the line monitoring mode; and switching the receiving facsimile device from the voice-capable mode to the facsimile mode once the at least one facsimile calling tone is detected, wherein detecting the at least one facsimile calling tone occurs at least one of during, after, and a combination of during and after voice communication, wherein the detecting of the at least one facsimile calling tone occurs from the establishment of the connection substantially during and after the voice communication.

2. The method of claim 1 wherein the line monitoring mode comprises an on-hook line monitoring mode.

3. The method of claim 2 wherein establishing the connection comprises the receiving facsimile device automatically answering a connection initiated by the sending facsimile device, and wherein the receiving facsimile device automatically answers the connection initiated by the sending facsimile device after a predetermined number of rings.

4. The method of claim 1 wherein the line monitoring mode comprises an off hook line monitoring mode.

5. The method of claim 4 wherein establishing the connection comprises manually answering at the receiving facsimile device a connection initiated by the sending facsimile device.

6. The method of claim 1 wherein establishing the connection comprises answering a connection initiated by the receiving facsimile device.

7. The method of claim 1 further comprising sending a facsimile answer tone from the receiving facsimile device to the sending facsimile device to initiate facsimile communication once the receiving facsimile device is in the facsimile mode.

8. The method of claim 1 wherein switching the receiving facsimile device from the voice-capable mode to the facsimile mode comprises terminating voice communication.

9. The method of claim 1 wherein detecting the facsimile calling tone further comprises detecting a signal having a frequency in a frequency band comprising frequencies between approximately about 1062 hertz to about 1138 hertz and an ON duration of between approximately 425 msec to about 575 msec and an OFF duration of between approximately 2550 msec to about 3450 msec.

10. The method of claim 1 wherein the sending facsimile device and the receiving facsimile device each comprise a communication device operable for at least one of facsimile communication, voice communication, data communication, and a combination of at least two of the foregoing.

11. The method of claim 1, wherein the facsimile calling tone signal comprises a CNG signal.

12. A communication device operable for at least one of facsimile communication, voice communication, and a combination of facsimile communication and voice communication, the communication device comprising:

a facsimile calling tone detection module operable to detect a plurality of signals after a connection is established between the communication device and a second communication device, each of the plurality of signals having a frequency and ON and OFF duration in a frequency band corresponding to a facsimile calling tone, the connection being for at least one of facsimile communication, voice communication, and a combination of facsimile communication and voice communication; and a communication mode selector operable to switch the communication device from a voice-capable mode to a facsimile mode once the facsimile calling tone detection module detects at least two facsimile calling tones after the connection is established, wherein the facsimile calling tone detection module detects at least two facsimile calling tones at least one of during, after, and a combination of during and after voice communication, wherein the facsimile calling tone detection module detects at least two facsimile calling tone substantially during and after the voice communication.

13. The communication device of claim 12 wherein the communication mode selector is only operable to switch the communication device from a voice-capable mode to a facsimile mode if the at least two facsimile calling tones are detected within a predetermined time after the connection is established.

14. The communication device of claim 12 wherein the at least two facsimile calling tones comprise a first calling tone and a second calling tone, and wherein the communication mode selector is only operable to switch the communication device from a voice-capable mode to a facsimile mode if the second calling tone is detected within a predetermined time after the first calling tone is detected.

15. The communication device of claim 14 wherein the predetermined time is approximately between about three seconds and about four seconds.

16. The communication device of claim 12 wherein the connection comprises at least one of an on-hook connection, and off-hook connection, and a combination of an on-hook connection and an off-hook connection.

17. The communication device of claim 12 wherein the frequency band corresponding to a facsimile calling tone comprises frequencies between approximately about 1062 hertz to about 1138 hertz and an ON duration of between approximately 425 msec to about 575 msec and an OFF duration of between approximately 2550 msec to about 3450 msec.

18. The method of claim 12, wherein the at least two facsimile calling tones comprises at least two CNG tones.

19. A method of validating a facsimile communication between at least two communication devices, the method comprising:

detecting at a first communication device at least two facsimile calling tones after a connection is established between the first communication device and a second communication device, the connection being utilized for at least one of facsimile communication, voice communication, and a combination of facsimile communication and voice communication; and switching the first communication device from a first communication mode to a second communication mode once the at least two facsimile calling tones are detected by the first communication device, the first communication mode comprising a voice-capable communication mode, the second communication mode comprising a facsimile communication mode, wherein detecting the at least two facsimile calling tones occurs at least one of during, after, and a combination of during and after voice communication, wherein the detecting of the at least two facsimile calling tones occurs from the establishment of the connection substantially during and after the voice communication.

20. The method of claim 19 wherein each of the detected facsimile calling tones is generated by the second communication device.

21. The method of claim 19 wherein switching the first communication device from the first communication mode to the second communication mode comprises terminating voice communication.

22. The method of claim 19 wherein detecting the at least two facsimile calling tones further comprises detecting the second of said at least two facsimile calling tones within a predefined sampling window.

23. The method of claim 22 wherein the predefined sampling window extends from just prior to the minimum expected time for receiving the second of said at least two facsimile calling tones to just after the maximum expected time for receiving the second of said at least two facsimile calling tones.

24. The method of claim 23 wherein the minimum expected time is less than or equal to 2.5 seconds and the maximum expected time is equal to or greater than 3.5 seconds.

25. The method of claim 19 wherein detecting the facsimile calling tone further comprises detecting a signal having a frequency in a frequency band comprising frequencies between approximately about 1062 hertz to about 1138 hertz and an ON duration of between approximately 425 msec to about 575 msec and an OFF duration of between approximately 2550 msec to about 3450 msec.

* * * * *